United States Patent
Kemppainen et al.

(10) Patent No.: US 6,662,710 B1
(45) Date of Patent: Dec. 16, 2003

(54) CHARGING APPARATUS FOR TRANSFERRING BAKERY PRODUCTS INTO AND FROM AN OVEN

(75) Inventors: Esa Kemppainen, Kotka (FI); Jukka Joukainen, Metsäkylä (FI)

(73) Assignees: Teknokym Oy, Kolka (FI); Jokilink Oy, Metsakyla (FI)

( * ) Notice: Subject to any disclaimer, the term of this patent is extended or adjusted under 35 U.S.C. 154(b) by 0 days.

(21) Appl. No.: 10/089,935
(22) PCT Filed: Sep. 22, 2000
(86) PCT No.: PCT/FI00/00812
§ 371 (c)(1), (2), (4) Date: Aug. 30, 2002
(87) PCT Pub. No.: WO01/24638
PCT Pub. Date: Apr. 12, 2001

(30) Foreign Application Priority Data

Oct. 5, 1999 (FI) .................................................. 992146

(51) Int. Cl.[7] .............................. A23L 1/00; A47J 37/00; A21B 3/07; A21B 7/00
(52) U.S. Cl. .............................. 99/334; 99/352; 99/355; 99/427; 99/443 C; 99/386; 198/820
(58) Field of Search ........................ 99/331–335, 339, 99/340, 352–355, 359–361, 386, 443 C, 443 R, 470, 477–479, 483, 427, 357; 198/820; 432/133, 126, 128; 414/902, 907; 219/388, 400; 126/21 A, 281; 426/523

(56) References Cited

U.S. PATENT DOCUMENTS 3,603,271 A    9/1971  Remensperger et al.
4,882,981 A  * 11/1989  Bacigalupe et al. .......... 99/479
5,123,336 A  *  6/1992  Konig .......................... 99/355
5,396,835 A    3/1995  Savolainen et al.

FOREIGN PATENT DOCUMENTS

| AT | 340342 | 12/1977 |
| DE | 2016220 | 10/1971 |
| DE | 196 37 294 | 3/1998 |
| GB | 10195 | of 1908 |

* cited by examiner

Primary Examiner—Timothy F. Simone
(74) Attorney, Agent, or Firm—Young & Thompson

(57) ABSTRACT

The invention relates to a charging apparatus for transferring bakery products into and from an oven. The charging apparatus comprises a charging table, which is transferable to a first position at the bakery line so that the bakery products to be baked are transferable to the charging table, transferable at the oven so that those bakery products to be baked that were transferred to the charging table in the first position are transferable from the charging table to the oven, transferable at the oven so that the bakery products baked in the oven are transferable to the charging table, and transferable to a second position at the bakery line so that the bakery products baked and transferred to the charging table are transferable from the charging table in the second position. The charging table is rotatable substantially horizontally, allowing the bakery products to be baked or the baked bakery products to be transferred to the charging table, and, similarly, the bakery products to be baked or the baked bakery products to be transferred from the charging table in any horizontal direction of rotation of the charging table.

8 Claims, 4 Drawing Sheets

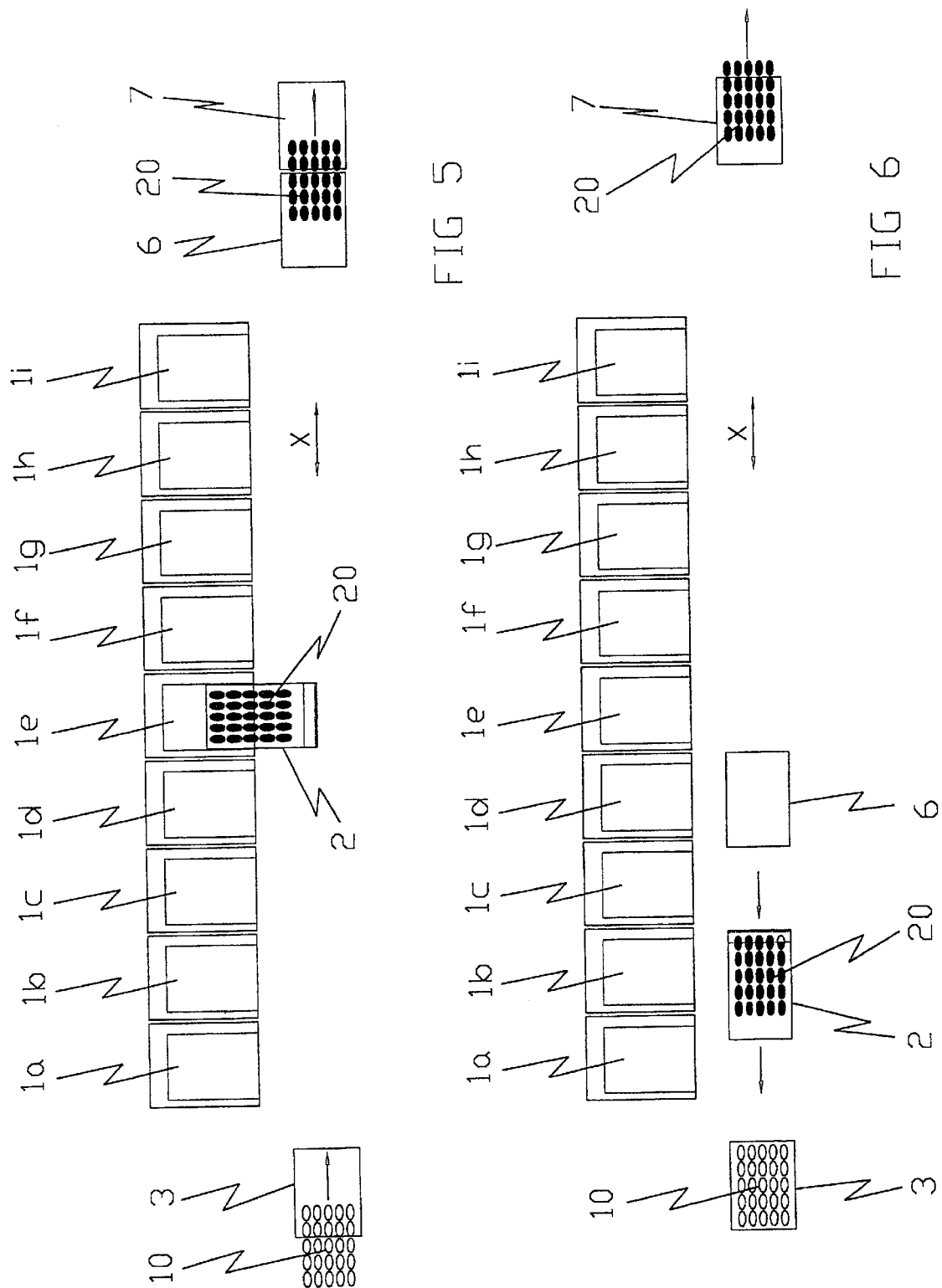

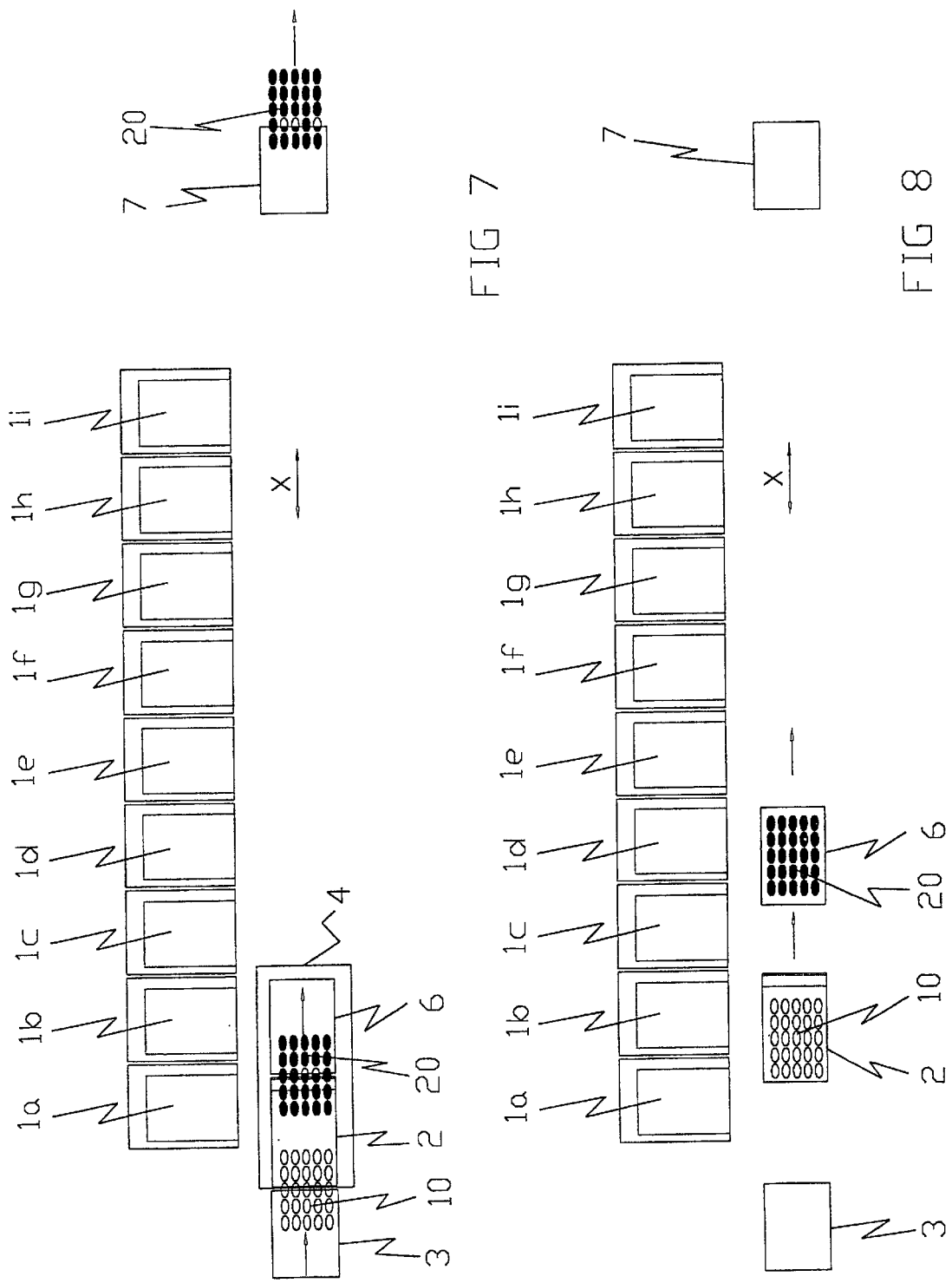

CHARGING APPARATUS FOR TRANSFERRING BAKERY PRODUCTS INTO AND FROM AN OVEN

CROSS REFERENCE TO RELATED APPLICATION

This is the 35 USC 371 national stage of international application PCT/FI00/00812 filed on Sep. 22, 2000, which designated the United States of America.

BACKGROUND OF THE INVENTION

The invention relates to a charging apparatus for transferring bakery products into and from an oven according to the preamble of claim 1.

A charging apparatus is a device located in front of bakery ovens for automatically transferring the bakery products to be baked from a proving drawer or another point in the bakery line into an oven and for removing the baked bakery products from the oven. The charging apparatus transfers a charging table laterally and vertically to that layer of the oven, a grate, onto which the bakery products to be baked are conveyed by means of the charging table for baking or from which the baked bakery products are removed from the oven. Charging apparatuses are referred to by different terms, such as filling and emptying devices for story grate ovens and baking robots.

Charging tables in known charging apparatuses move only laterally (direction X) and vertically (direction Y) in front of bakery ovens, and for this reason in known bakery lines all ovens have to be placed in parallel in one row. The charging table transfers the bakery products to be baked into the oven and transfers the baked bakery products from the oven moving also perpendicularly (direction Z) with respect to said directions;

A charging table is usually provided with a belt conveyor for conveying the products to be baked onto the charging table, from the charging table further into the oven, and for transferring the baked bakery products from the oven back to the charging table, and further from the charging table also in the direction of the table (direction Z).

Since in these known bakery lines the ovens are located in one row, the length the charging table travels laterally (direction X) becomes the longer the more ovens the bakery line comprises, and this restricts the capacity of the bakery line and causes restrictions for the use of space. The bakery products baked or to be baked can only be conveyed to and from the charging table only either from the front or from behind (direction Z), and this causes further restrictions.

Such charging apparatuses are known for example from the publications EP 568787 and EP 231831.

SUMMARY OF THE INVENTION

It is thus an object of the invention to provide a charging apparatus for solving the above problems.

The object of the invention is achieved with a charging apparatus, which is characterized in that the charging table is rotatable substantially horizontally, allowing the bakery products baked or to be baked to be transferred to the charging table and, similarly, the bakery products baked or to be baked to be transferred from the charging table in any horizontal direction of rotation of the charging table.

The preferred embodiments of the invention are disclosed in the dependent claims.

The invention is based on the idea of improving the properties of a charging apparatus significantly with respect to known apparatuses by enabling the charging table to rotate round a vertical axis so as to eliminate the above restrictions. The location of the ovens, the transfer of the products to be baked to the charging apparatus and the removal of the baked products from the charging apparatus can be carried out horizontally from any direction. The invention thus allows the ovens and other devices to be located in another manner than only in one row. This allows the space in a bakery to be utilized more efficiently.

The invention also allows the addition of a crab to the charging apparatus for the removal of the baked products, which brings about a significant improvement in the capacity of the bakery line. A crab allows, for example, more ovens to be added to the bakery line. In conventional bakery lines the addition of ovens would result, for example, in that the charging table would not have time to remove the baked bakery products in time from the oven.

A crab is a conveyor device that moves independently for example laterally (direction X), and onto which the charging apparatus transfers the baked products removed from the oven, and which the crab transfers for example to a processing line for baked products, for example a cooling conveyor. This means that the charging table does not have to be driven to be emptied to an emptying station in the bakery line; instead, the charging table can be emptied onto the crab for example at the same time as the bakery products to be baked are transferred to the charging table. In this case the baked products can be transferred for example from the charging table to the crab when they are located one after the other. The transfer can take place when the charging table and the crab are located at any point in direction X.

Like the charging table of the charging apparatus, the crab can also be rotating, allowing baked products to be transferred from the crab in any direction.

BRIEF DESCRIPTION OF THE DRAWINGS

The invention will now be described in greater detail by preferred embodiments with reference to the attached drawings, in which FIGS. 5 to 8 show a bakery line with a crab at different points of time.

DETAILED DESCRIPTION OF THE INVENTION

The invention relates to a charging apparatus (not denoted by a reference number) for transferring bakery products 10 to be baked to an oven 1a to 1f and, similarly, for transferring baked bakery products 20 from the oven 1a to 1f, the charging apparatus comprising a charging table 2.

Figure 2:
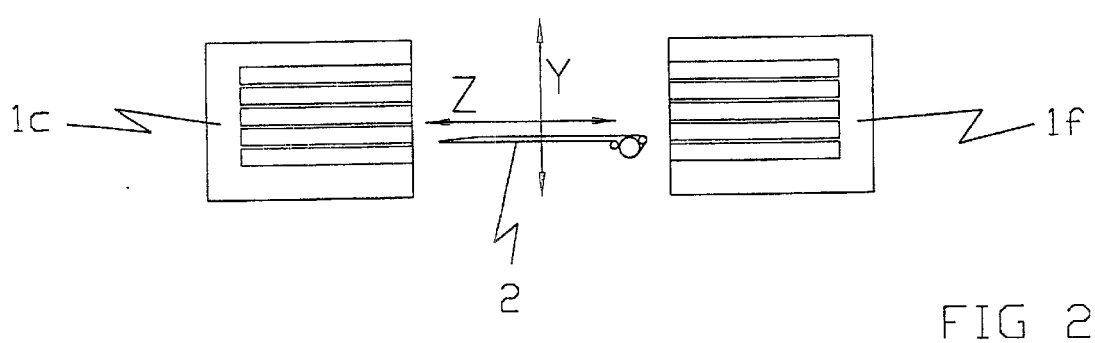
FIG. 2 is a side view in cross section of the bakery line of FIG. 1, sectioned at the ovens.

The attached figures show bakery lines comprising several ovens 1a to 1f. Each oven 1a to 1f is preferably, but not necessarily, an oven having several layers (not denoted by reference numbers), on which bakery products can be baked. FIG. 2 schematically shows such multi-layer ovens.

The charging table 2 is a) transferable to a first position 3 at the bakery line so that the bakery products 10 to be baked are transferable in the first position 3 to the charging table 2, b) transferable from the first position 3 at the bakery line at the oven 1a to 1f so that those bakery products 10 to be baked that were transferred to the charging table 2 in the first position 3 are transferable from the charging table 2 to the oven 1a to 1f, c) transferable at the oven 1a to 1f so that the bakery products 20 baked in the oven 1a to 1f are transferable to the charging table 2, and d) transferable to a second position 4 at the bakery line so that the bakery products 20 baked and transferred to the charging table 2 at the oven 1a to 1f are transferable from the charging table 2 in the second position 4.

Between steps b) and c), the charging table 2 can for example transfer the baked bakery products 20 from some other oven 1a to 1f, execute steps c) and d), and/or transfer the bakery products 10 to be baked to some other oven 1a to 1f, execute steps a) and b) and/or simply wait for the execution of one or more of the above steps.

In the charging apparatus of the invention, the charging table 2 is rotatable substantially horizontally, so that the bakery products 10 to be baked or the baked bakery products 20 are transferable to the charging table 2 and, similarly, the bakery products 10 to be baked or the baked bakery products 20 are transferable from the charging table 2 in any horizontal direction of rotation A of the charging table 2.

The charging table 2 is preferably transferable at least partly substantially horizontally into and out from the oven 1a to 1f. This facilitates the placement of the bakery products 10 to be baked in the oven 1a to 1f and, similarly, the removal of the baked bakery products 20 from the oven 1a to 1f.

The charging table 2 preferably comprises a first conveyor belt 5, which is movable towards and backwards, so that the bakery products 10 to be baked and the baked bakery products 20 are transferable to the charging table 2 and from the charging table 2 from the same end of the charging table 2 by moving the first conveyor belt 5 in different directions.

At the same time as the charging table 2 is moved into or out from the oven 1a to 1f, the first conveyor belt 5 moves at preferably substantially the same speed in the opposite direction. The above-described arrangement can also be utilized when the bakery products 10 to be baked are transferred to the charging table 2 and when the baked bakery products 20 are removed from the charging table 2.

The first conveyor belt 5 is preferably oblique in the area of its tip (not denoted by a reference number). Such an arrangement facilitates particularly the transfer of the bakery products 10 to be baked to the charging table 2.

The second position 4 of the bakery line preferably comprises an automatically transferable crab 6, onto which the baked bakery products 20, transferred to the charging table 2 at the oven 1a to 1f, are transferable. In other words, the location of the second position 4 may be variable, i.e. the second position 4 is located at the point where the baked bakery products 20 are transferred to the crab 6, and this point does not have to be fixedly defined. See FIG. 7, for example. In this case the crab 6 is transferable to a third position 7 such that the baked bakery products 20, transferred from the charging table 2, are transferable from the crab 6 in the third position 7. This third position 7 of the bakery line preferably comprises a second conveyor arranged to transfer the baked bakery products 20 transferred thereto from the crab 6 for further processing. In other words, in such a bakery line the third position corresponds to the second position in a bakery line not comprising a crab 6.

The crab 6 is also preferably horizontally rotatable such that the baked bakery products 20 are transferable in the second position 4 from the charging table 2 to the crab 6, and, similarly, the baked bakery products 20 are transferable in the third position 7 from the crab 6 in any horizontal direction of rotation of the crab 6 (not shown in the figures). In this case the crab 6 is rotatable in such a way that it is parallel to the charging table 2 when the baked bakery products 20 are transferred in the second position 4 from the charging table 2 to the crab 6 (see FIGS. 4 and 7). The rotation of the crab 6 allows the baked bakery products 20 transferred to the crab 6 to be then transferred in the third position 7 in any direction.

The crab 6 is preferably liftable (not shown in the figures) and lowerable (not shown in the figures) substantially vertically (direction Y) such that the baked bakery products 20 are transferable from the charging table 2 to the crab 6 in the second position 4, and the baked bakery products 20 are transferable in the third position 7 from the crab 6 in different vertical positions of the crab 6. This allows for example the baked bakery products 20 to be conveyed to a multi-layer (not shown in the figures) third position 7. The multi-layer third position 7 may comprise for example a multi-layer slope or ramp, along which the baked bakery products 20 slide forward for further processing. Such a multi-layer third position 7 can be used for example to sort the baked bakery products 20 into predefined quality categories.

The crab 6 preferable comprises a second conveyor belt 8. The second conveyor 8 belt is preferably movable to and fro, so that the baked bakery products 20 are transferable to the crab 6 and from the crab 6 from the same end of the crab 6 by moving the second conveyor belt 8 in different directions. The second conveyor belt 8 is preferably arranged to move substantially at the same speed in the opposite direction when the crab 6 is moved for example in the third position 7 in order to simplify the removal of the baked bakery products 20 from the crab 6. The above-described arrangement can also be utilized when the bakery products 10 to be baked are transferred to the charging table 2 and when the baked bakery products 20 are removed from the charging table 2.

The above-described arrangement can also be utilized when the bakery products 10 to be baked are transferred to the charging table 2 and when the baked bakery products 20 are removed from the charging table 2.

Figure 4:
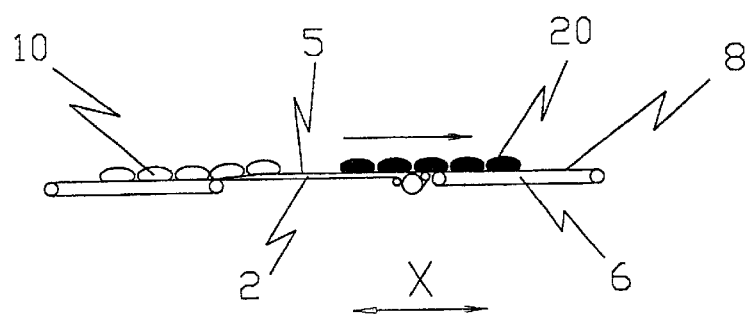
FIG. 4 shows how baked bakery products are transferred from a charging table to a crab at the same time as bakery products to be baked are transferred to the charging table.

FIG. 4 shows an embodiment where the crab 6 is transferable to the first position 3 so that the bakery products 20 baked in the oven 1a to 1f are transferable from the charging table 2 to the crab 6 at the same time as the bakery products 10 to be baked are transferable to the charging table 2 in the first position 3.

Figure 1:
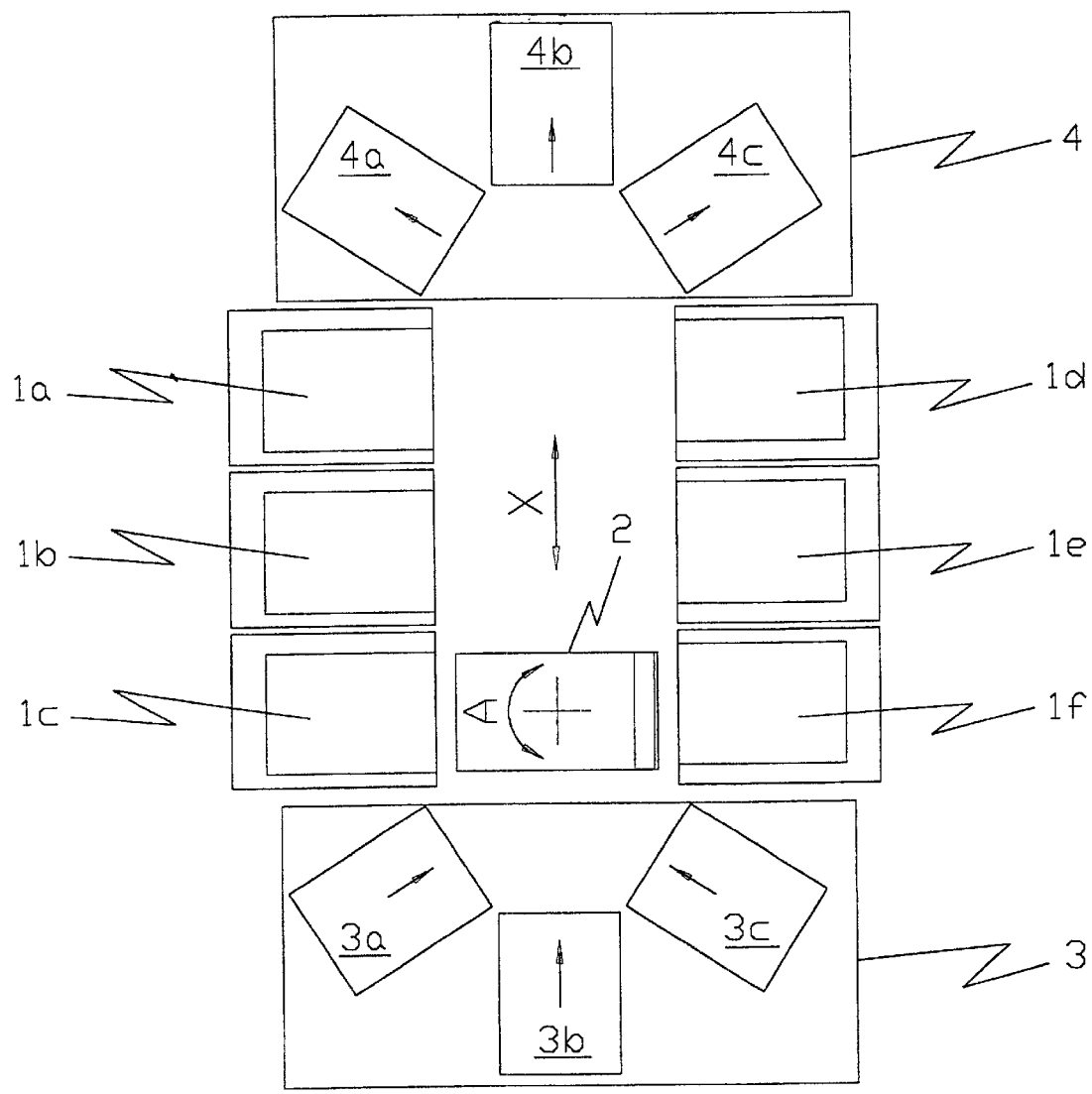
FIG. 1 shows a bakery line having six ovens placed in two rows, a charging table being located at one oven.

FIG. 1 is a top view and FIG. 2 a side view of a bakery line comprising six baking ovens 1a to 1f, the ovens 1a to 1f being placed in two rows and the charging table 2 of the charging apparatus being located in directions X, Y with respect to the ovens, and the transfer of the bakery products 10 to be baked into the oven 1a to 1f and the removal of the baked bakery products from the oven 1a to 1f takes place in the direction of movement Z (see FIG. 2). These directions of movement also exist in known devices, but the charging table 2 of the device of the invention is also rotatable round its vertical axis in direction A. Known devices allow bakery products to be transferred into and removed from ovens 1a, 1b and 1c only, whereas the rotating charging table 2 of the invention allows the bakery products to be also transferred to and removed from ovens 1d, 1e and 1f, for the filling and emptying of which the charging table 2 rotates 180°.

Figure 3:
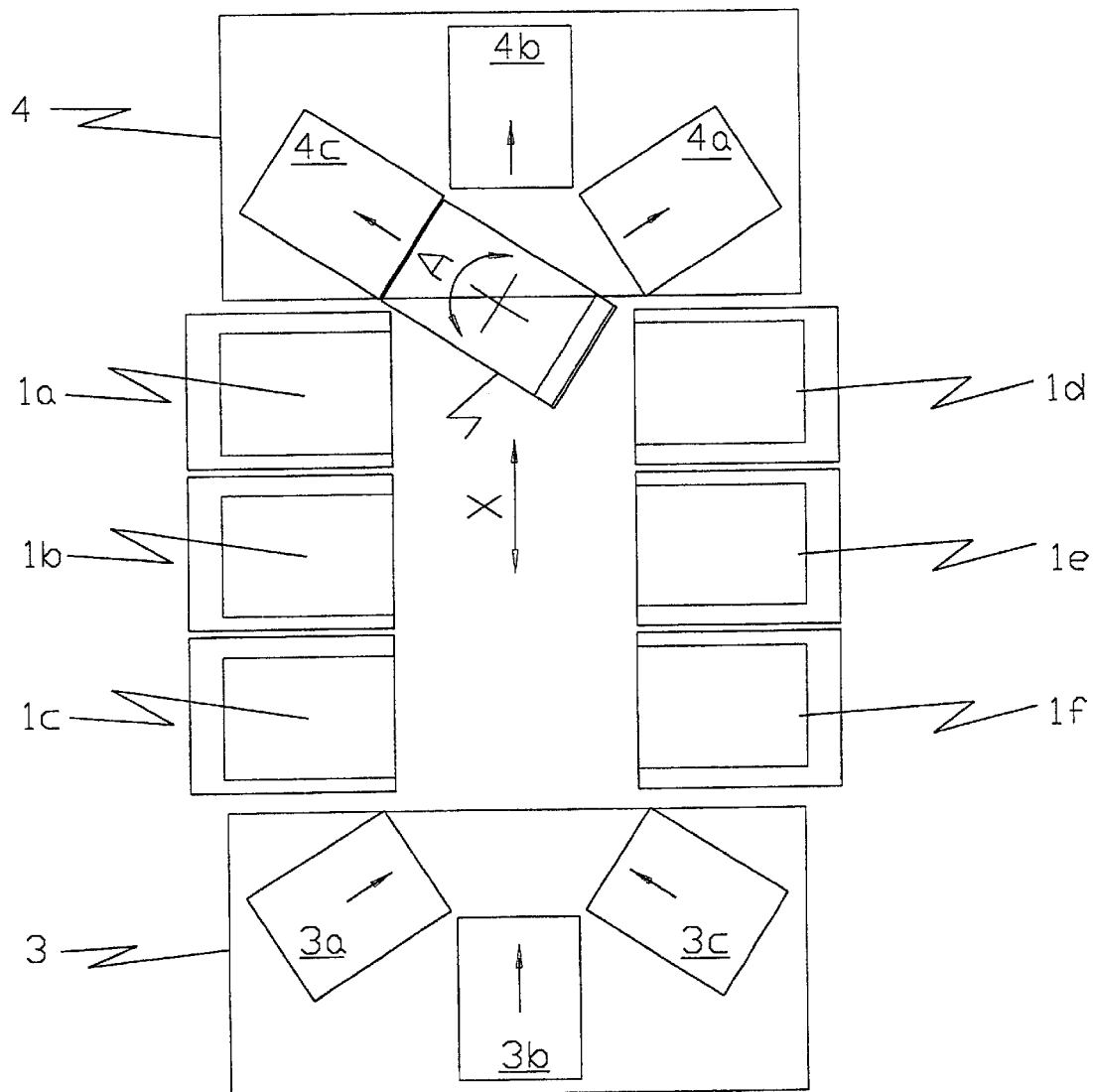
FIG. 3 shows the bakery line of FIG. 1 with the charging table in a second position.

In FIG. 1 and 3, the bakery products 10 to be baked are transferred to the charging table 2 by means of first devices 3a, 3b and 3c in the first position 3. These first devices may be conveyors, or for example plane tables or multi-layer shelves, from which the charging table 2 collects the bakery products. The first devices may also be or comprise proving drawers.

In FIGS. 1 and 3, the baked bakery products 20 are removed by means of second devices 4a, 4b or 4c in the second position 4. These second devices may be conveyors or for example plane tables or multi-layer shelves, onto which the charging table 2 transfers the bakery products.

In the example of FIG. 3, which shows the same bakery line as FIG. 1, the charging table 2 has moved to the second position 4 at conveyor 4a, and at the same time it has been pushed slightly forward for removing the baked bakery products 20.

FIGS. 5 to 8 show a bakery line comprising a crab 6, and the ovens 1a to 1i are in one row, and for the bakery products 10 to be baked to be able to be collected in the first position 3 and the baked bakery products 20 to be released in the third position 7, the charging apparatus has to be able to rotate 90°.

FIG. 5 shows a situation where the charging table 2 is collecting the baked bakery products 20 from oven 1e in a bakery line comprising nine ovens 1a to 1i at the same time as the crab 6 transfers the baked bakery products 20 to a conveyor or the like in the third position 7, and the bakery products 10 to be baked are being transferred to a conveyor or the like in the first position 3. In this case, the speeds of the second conveyor belt 8 of the crab 6 and the conveyor of the third position 7 are substantially equal.

FIG. 6 shows the situation after FIG. 5, the charging table moving towards the first position 3 with the baked bakery products 20 fetched from oven 1e, and the crab 6 is empty and moving towards the first position 3.

FIG. 7 shows the situation after FIG. 6, the bakery products 10 to be baked being transferred to the charging table 2 at the same time as the baked bakery products 20 are transferred to the crab 6. FIG. 4 is a side view of the situation of FIG. 7. In this case the speeds of the conveyor of the first position 3, the first conveyor belt 5 of the charging table 2 and the second conveyor belt 8 of the crab 6 are substantially equal.

FIG. 8 shows the situation after FIG. 7, the crab 6 moving towards the third position 7 with the baked bakery products 20, and the charging table 2 moving towards the oven 1a to 1i, to which it is transferring the bakery products 10 to be baked.

The charging apparatus naturally also comprises a control system, to which the ovens 1a to 1f and other peripherals are also connected, such as the devices of the first position 3, the second position 4, and the optional third position 7, and an optional crab 6. The control system controls said devices so that the bakery products 10 to be baked are conveyed at the right time from the right point to the right oven 1a to 1f, and discharges the baked bakery products 20 from the right oven 1a to 1f and conveys them to the right place.

It is obvious to a person skilled in the art that as technology advances, the basic idea of the invention can be implemented in a variety of ways. The invention and its embodiments are thus not restricted to the above examples, but may vary within the scope of the claims.

What is claimed is:

1. A charging apparatus for transferring bakery products to be baked to an oven and baked products from the oven, the charging apparatus comprising a charging table, and wherein the charging table is transferable to a first position at a bakery line so that bakery products to be baked are transferable in the first position to the charging table;

the charging table is transferable from the first position at the bakery line at the oven so that those bakery products to be baked that were transferred to the charging table in the first position are transferable from the charging table to the oven;

the charging table is transferable at the oven so that the bakery products baked in the oven are transferable to the charging table;

the charging table is transferable to a second position at the bakery line so that the baked products transferred to the charging table at the oven are transferable from the charging table in the second position;

the charging table is rotatable substantially horizontally, allowing the bakery products to be baked or the baked products to be transferred to the charging table, and, similarly, the bakery products to be baked or the baked products to be transferred from the charging table in any horizontal direction of rotation of the charging table;

the charging table comprising a first conveyor belt, which is movable forwards and backwards, so that the bakery products to be baked and the baked products are transferable to the charging table and, similarly, from the charging table from a same end of the charging table by moving the first conveyor belt in different directions; and the charging table being transferable at least partly substantially horizontally into and out of the oven.

2. The apparatus as claimed in claim 1, wherein at the same time as the charging table is moved into the oven or out of the oven, the first conveyor belt is arranged to move at substantially the same speed in the opposite direction.

3. The apparatus as claimed in claim 1, wherein the second position of the bakery line comprises an automatically transferable crab, onto which the baked products, transferred to the charging table at the oven, are transferable, and the crab is transferable to a third position such that the baked products, transferred from the charging table, are transferable from the crab in the third position.

4. The apparatus as claimed in claim 3, wherein the crab is horizontally rotatable such that the baked products are transferable to the crab, and, similarly, the baked products are transferable from the crab in any horizontal direction of rotation of the crab.

5. The apparatus as claimed in claim 3, wherein the crab comprises a second conveyor belt.

6. The apparatus as claimed in claim 5, wherein the second conveyor belt is movable to and from, so that the baked products are transferable to the crab and, similarly, from the crab from a same end of the crab by moving the second conveyor belt in different directions.

7. The apparatus as claimed in claim 3, wherein the crab is movable to the first position such that the baked products in the oven are transferable from the charging table to the crab substantially at the same time as the bakery products to be baked are transferable to the charging table in the first position.

8. The apparatus as claimed in claim 3, wherein the crab is vertically liftable and lowerable.

* * * * *